United States Patent Office 3,597,350
Patented Aug. 3, 1971

3,597,350
GEL FILTRATION PROCESS
Helmut Determann, Frankfurt am Main, and Theodor Wieland, Mainz, Germany, assignors to Pharmacia Fine Chemicals AB, Uppsala, Sweden
No Drawing. Continuation-in-part of application Ser. No. 750,003, Aug. 5, 1968. This application Nov. 12, 1968, Ser. No. 775,185
Int. Cl. B01d 15/08
U.S. Cl. 210—31                                   6 Claims

ABSTRACT OF THE DISCLOSURE

A gel filtration separating medium of grains of regenerated cellulose and a method of preparation are provided. The grains of regenerated cellulose contain water or a highly aqueous liquid, contain 2 to 25 gms. of cellulose per deciliter of grain volume, and have pore sizes mainly in the range of from 2 to 200 millimicrons.

---

This is a continuation-in-part of application Ser. No. 750,003, filed Aug. 5, 1968, and now abandoned.

The present invention concerns a separating medium for gel filtration.

Processes for the separation of substance mixtures by gel filtration are generally known and used. For this type of separation processes mixtures of substances having relatively large molecular sizes may come in question, these mixtures optionally also containing one or more ingredients having small molecular sizes such as low molecular weight substances of the type salts and sugars. In the separation of substance mixtures by gel filtration, these substances exist dissolved in a solvent. The solution is contacted with gel grains which are commonly arranged in the form of one or more beds, the grains being swollen in the solvent and having such a structure that the substances are differently distributed between the gel grains and the surrounding solution according to their molecular sizes. Hereupon the solvent is supplied to the mass of gel grains for elution purposes while recovering at least one fraction containing one or more substances having relatively large molecular sizes and at least one fraction containing one or more substances having relatively small molecular sizes. Also mixtures of substances having very large molecular sizes such as viruses have been subjected to gel filtration. For such a process it is necessary to use gel grains having relatively large pores to attain the desired different distribution of substances between the gel grains and the solution surrounding the latter. Up to the present, mixtures of substances having the large molecular sizes set forth above have been able to separate by gel grains concontaining agarose. However, it has proved a disadvantage with these grains that they are too elastic to permit the building up of large beds and columns. If a column or bed becomes too high, the gel grains will be pressed together so much that an acceptable flow cannot be obtained or maintained through the column. Furthermore, agarose is unstable in acid and alkaline media and at elevated temperatures. Surprisingly, it has now proved that this disadvantage can be avoided or anyhow considerably reduced by a new separating medium.

The separating medium for gel filtration according to the invention consists of grains of regenerated cellulose, which grains contain water or a highly aqueous liquid and contain 2–25 percent of cellulose (weight per volume), said grains having pores, the size of which is mainly in the range of from 2 to 2000 m$\mu$.

Preferably, the grains have sizes which are mainly in the range of from 0.01 to 1 mm.

The new separating medium consists of colourless beads and is excellently stabile against mechanical action. It endures the influence of solvents, acids and bases of moderate concentration and changes of temperatures within in reasonable limits.

Physically, the present separating medium consists of rigid grains having a relatively low density. A product reminding of the present separating medium is previously known (see U.S.A. patent specification No. 2,543,928). It consists of beads of a relatively high density. While the product according to the invention has a relatively low density in the range of from about 0.01 to 1.10, the product according to the U.S. patent specification has a density in the range of from 1.45 to 1.6. Owing to the known product being relatively compact, and its porosity consequently relatively low, it cannot be used as a separating medium for gel filtrations as contemplated according to the invention.

The method for preparing the separating medium is characterized thereby that a solution of cellulose having a concentration of 1–12 percent (weight per volume) is finely divided into droplets, whereupon the droplets thus obtained are contacted with a regenerating agent for the cellulose under such conditions that the droplets are surrounded by liquid immisicble with the cellulose solution; and the grains containing cellulose then recovered.

The difference between the process as described and the process according to the U.S. patent specification is that, according to the latter, droplets of a solution of cellulose are introduced into a regenerating bath consisting of a solution of the regenerating agent in a solvent miscible with the solvent for the cellulose (water). Hereby, the cellulose undergoes a strong shrinking in the regenerating process and changes into crystalline form, so that the grains become compact and attain a high density. According to the present invention, this shrinking is avoided by the cellulose being regenerated with a liquid immiscible with the solvent for the cellulose.

Only few solvents for cellulose are known and may come in question for the purpose according to the invention. As exampes of such solvents may be mentioned cuprammonium hydroxide solution; cadmium ethylenediamine solution; iron tartrate solution; and alkaline carbon disulphide solution.

The concentration of cellulose in the solution thereof to be finely divided is of great importance in that it has an influence upon the average pore size of the separating medium obtained. If the concentration of cellulose is low there will be obtained a higher average pore size than when the concentration is high. Very porous grains of the cellulose differ from less porous grains concerning the property of enduring dewatering and shrinkage. While the low porous grains endure dewatering and are swellable to the original volume on repeated contact with water, this is not the case with the highly porous grains. The latter, of course, swell again in water but not so far as to the original volume.

A method of finely dividing the cellulose solution is to introduce it into a solution of an emulsion stabilizing agent in a solvent immiscible with water and to agitate the mixture until an emulsion has been formed. Another method is to spray the solution of cellulose out into the atmosphere, whereupon the droplets are collected in and mixed with the solution of regenerating agent.

As stabilizing agents may be used substances having surface active properties (detergents) of the type that yield water-in-oil-type emulsions. Also polymers, for example derivatives of cellulose soluble in organic solvents may come in question. The content of stabilizing agent can vary within broad limits. Usually there are, however, used 0.1–15 percent, preferably 0.2–10 percent (weight per volume) of the stabilizer in the liquid immiscible with water to be used for the emulsifying process.

As a solvent for the formation of the emulsion and for the regenerating agent may come in question aliphatic and aromatic hydrocarbons and solvents like dichloro methane; 1,2-dichloroethane; 1,2-dibromo-ethane; o-dichlorobenzene, etc.

As regenerating agents for the cellulose may be used acids which must present a certain solubility in solvents immiscible with water. The more water soluble this acid is, the less porous will be the surface of the beads as formed. This offers a possibility of controlling the average pore size of the process products. In this connection may be mentioned that acetic acid yields smaller pores than benzoic acid. Examples of suitable acids are acetic acid and benzoic acid.

The invention will now be further elucidated by way of some examples.

EXAMPLE 1

1.25 g. Emulphor EL (a reaction product of fatty acids from ricinus oil and ethylene oxide obtained from BASF, Germany) was dissolved in 500 ml. benzene in a 1-lit. three necked flask. A solution of 2 g. cellulose (linters powder), 1.2 g. cupric hydroxide and 0.2 g. cuprous chloride in 100 ml. concentrated aqueous ammonia was added slowly to the benzene solution while stirring with 1250 r.p.m. with a blade stirrer. After 10 minutes the dispersion was allowed to flow into a well stirred solution of 250 g. benzoic acid in 3.8 lit. benzene. Then the stirrer was stopped and the product was allowed to settle overnight, whereafter the supernate was removed. The solids were treated with 1 lit. 8% aqueous sodium hydroxide solution to dissolve the ammonium benzoate after which the cellulose beads were recovered on a filter. The product was then wet sieved in water with a simultaneous thorough washing. To remove remaining copper salts, the main fractions, 50–100 microns and 100–200 microns, were treated overnight with 50% aqueous acetic acid. After having washed away the acid the last trace of copper was removed by a treatment with a solution of 0.01 molar ethylene-diamine tetraacetic acid in 0.01 molar aqueous sodium hydroxide solution. The yield was 75 ml. (expressed as volume of wet packed gel grains) having the following particle size distribution:

| Microns: | Percent |
|---|---|
| 30–50 | 4 |
| 50–100 | 40 |
| 100–200 | 51 |
| 200–315 | 5 |

The 100–200 micron fraction had the following chemical data:

| | Cellulose |
|---|---|
| Ash content mg./g | 2.2 |
| Copper content μg./g | 3.4 |
| Content of carboxyl groups μeq./g | 2.5 |

The 100–200 micron fraction, combined with sufficient amounts of the same fraction from other batches prepared in the same way, was packed in a chromatographic tube, having an inner diameter of 1 cm., to a bed volume of 84.0 ml. The elution volume of three test substances, i.e. *Escherichia coli* bacteria, blue coloured dextran having a weight average molecular weight of about 2,000,000 and benzyl alcohol. The elution volumes were 39.5, 77.0 and 84.2 respectively. Afterwards the gel bed was dried thoroughly to determine the amount of cellulose in the bed, which amounted to 1.87 g. From these data one can calculate that:

(a) the cellulose content in the beads was 4.2% (w./v.)
(b) the wet density of the beads was 1.02
(c) 84% of the volume of gel grains was accessible to the high molecular weight dextran.

EXAMPLE 2

According to the same technique described in Example 1 there was produced 390 ml. cellulose beads, having a particle size of 50–200 microns, by dispersing 300 ml. concentrated aqueous ammonia solution of 12 g. cellulose (linters powder), 7.2 g. cupric hydroxide and 0.75 g. cuprous chloride in a solution of 6 g. Emulphor EL in 400 ml. benzene using a stirrer speed of 1250 r.p.m.

This product was investigated with respect to rigidity, i.e. its ability to resist compression under the influence of a pressure drop thereby being able to maintain high flow rates under chromatographic experiments. The product was packed in a chromatographic tube with an inner diameter of 2.5 cm. to a bed height of 22.7 cm. Various pressures (hydrostatic heads) were applied to the column and the flow rate and bed height were measured. The following table shows the results:

| | Bed height, cm. | Flow rate | |
|---|---|---|---|
| | | Ml./hour | Pressure |
| Pressure, cm. water: | | | |
| 30 | 22.7 | 57 | 1.9 |
| 50 | 22.7 | 94 | 1.9 |
| 70 | 22.7 | 136 | 1.9 |
| 90 | 22.6 | 185 | 2.1 |
| 110 | 22.5 | 228 | 2.1 |
| 130 | 22.2 | 255 | 2.0 |

It is evident that the beads were highly rigid as flow rate increased proportionally to pressure and bed height remained virtually constant up to pressures as high as six times bed height.

EXAMPLE 3

According to the same technique as described in Example 1, a solution of 10 g. cellulose (linters powder), 7 g. cupric hydroxide and 0.25 g. cuprous chloride was dispersed in a solution of 5 g. Emulphor EL in 500 ml. benzene using a stirrer speed of 2850 r.p.m. After regeneration, wash and sieving procedures according to Example 1, a yield of 61 ml. was obtained having the following particle size distribution:

| Microns: | Percent |
|---|---|
| 30–50 | 5 |
| 50–100 | 14 |
| 100–200 | 33 |
| 200–315 | 39 |
| >315 | 9 |

The 100–200 micron fraction had the following analytical data:

| | Cellulose |
|---|---|
| Ash content mg./g | 3.0 |
| Copper content μg./g | 2.7 |
| Content of carboxyl groups μeq./g | 7.6 |

The 100–200 micron fraction was tested chromatographically in the same way as the product obtained in Example 1. In this case the bed volume was 84.0 ml., the elution volumes for coli bacteria, the coloured dextran and benzyl alcohol were 41.6 ml., 50.0 ml. and 82.3 ml. respectively and the amount of cellulose was 7.83 g. From these data one could calculate that (a) the cellulose content in the beads was 18.5% w./v.
(b) the wet density of the beads was 1.07
(c) 20% of the volume of gel grains was accessible to the high molecular weight dextran.

EXAMPLE 4

According to the same technique as described in Example 1, a solution of 3 g. cellulose (linters powder), 2.4 g. cupric hydroxide and 0.25 g. cuprous chloride in 100 ml. concentrated aqueous ammonia was dispersed in a solution of 2.5 g. Emulphor EL in 500 ml. benzene. Stirrer speed was 1800 r.p.m. The dispersed cellulose solution was regenerated with a solution of 125 g. acetic acid dissolved in 3.8 l. benzene. After having recovered the product as described in Example 1, the 100–200-micron fraction was tested chromatographically as described in Example 1. On a column of a bed volume of 84.0 ml. the elution volumes of coli bacteria, the dyed dextran and benzyl alcohol were 40.2 ml., 41.5 ml. and 84.6 ml. respectively. This material thus turned out to have smaller pores than that prepared according to Example 3, despite having a lower cellulose concentration.

EXAMPLE 5

A solution of 18 g. cellulose (chromatographic grade), 15 g. cupric hydroxide and 0.75 g. cuprous chloride in 300 ml. concentrated aqueous ammonia was dispersed in a solution of 11 g. cellulose acetate butyrate in 400 ml. ethylene chloride in a one litre reaction vessel by stirring with an anchor-shaped stirrer at 200 r.p.m. The dispersion was allowed to flow into a well stirred solution of 750 g. benzoic acid in 4 l. ethylene dichloride. The product was then allowed to float up, whereafter the ethylene dichloride layer was discarded and the product was washed thoroughly with acetone to remove remaining cellulose ester. After a treatment with 8% aqueous sodium hydroxide the product was then washed thoroughly with water on a 40 micron screen. Examination under the microscope revealed that the product was beaded.

EXAMPLE 6

A solution of 3 g. cellulose (rayon) in 100 g. aqueous cadmium ethylene diamine hydroxide (prepared according to Naturwiss. 44/1957/62) was dispersed in a solution of 1 g. Emulphor EL in 500 ml. benzene by stirring with 2300 r.p.m. and regenerated with a mixture of 500 ml. benzene and 500 ml. acetic acid. The cellulose beads were allowed to sediment and were then rinsed and sieved in water. The yield was 6 ml. cellulose beads having the following particle size distribution:

| Microns: | Percent |
|---|---|
| 30–50 | 0 |
| 50–100 | 25 |
| 100–200 | 72 |
| 200–315 | 2 |
| >315 | 1 |

EXAMPLE 7

A solution of 3 g. cellulose (linters powder) in 100 g. aqueous sodium iron tartrate (prepared according to Chemiefasern 34/1956/27) was dispersed in a solution of 5 g. Emulphor ED in 500 ml. benzene by stirring with 2300 r.p.m. and regenerated with a mixture of 500 ml. benzene and 500 ml. acetic acid. The cellulose beads were allowed to sediment and were then rinsed and sieved in water. The yield was 69 ml. cellulose beads having the following particle size distribution:

| Microns: | Percent |
|---|---|
| 30–50 | 1 |
| 50–100 | 13 |
| 100–200 | 29 |
| 200–315 | 30 |
| >315 | 27 |

EXAMPLE 8

100 g. technical viscose solution, containing 8% cellulose was dispersed in a solution of 5 g. Emulphor EL in 500 ml. benzene by stirring with 2300 r.p.m. and regenerated with a mixture of 500 ml. benzene and 500 ml. acetic acid. The cellulose beads obtained were allowed to settle after which they were rinsed and sieved in water. The yield was 69 ml. cellulose beads having the following particle distribution:

| Microns: | Percent |
|---|---|
| 30–50 | 0 |
| 50–100 | 48 |
| 100–200 | 30 |
| 200–315 | 13 |
| >315 | 9 |

EXAMPLE 9

A solution of 3 g. cellulose (linters powder), 2.4 g. cupric hydroxide and 0.25 g. cuprous chloride in 100 ml. concentrated aqueous ammonia was sprayed, by means of a device commonly used for developing thin-layer chromatograms, using a 5 to 1 volume ratio mixture of nitrogen and ammonia as the driving gas, into a well stirred mixture of 2 l. benzene, 500 ml. acetone and 500 ml. acetic acid. The distance between the orifice of the spraying device and the regenerating solution was 15 to 20 cm. and the direction of spraying was inclined 45° from the horizontal plane. Beaded particles were formed which were recovered in the usual way. A microtomic cut, when microphotographed using a magnification of 400 times, showed that the outer parts of the beads were denser than the inner parts.

EXAMPLE 10

According to Example 1 a solution of 3 g. cellulose (linters powder), 2.4 g. cupric hydroxide and 0.25 g. cuprous chloride in 100 ml. concentrated aqueous ammonia was dispersed in a solution of 2.5 g. Emulphor EL in 500 ml. benzene, regenerated with a solution of 250 g. benzoic acid in 3.8 l. benzene, and recovered. A microphotograph showing a microtomic cut of the beads obtained under a magnification of 530 times showed that the largest pores had a size of about 700 to 800 mµ.

What we claim is:
1. In a gel filtration process for separating substances of different molecular sizes from mixtures thereof, the improvement comprising a separating medium consisting of porous grains of regenerated cellulose containing water or a highly aqueous liquid and having pore sizes capable of separating said substances, said grains containing from 2 to 25 gms. of cellulose per deciliter of grain volume, and having pores the size of which is mainly in the range of from 2 to 2000 millimicrons, said grains having a specific gravity in the range from about 1.01 to 1.10.

2. A separating medium as claimed in claim 1, wherein the grains have sizes mainly in the range of from 0.01 to 1 mm.

3. The separating medium as claimed in claim 1 wherein the grains have sizes in the range of 100 to 200 microns.

4. The separating medium as claimed in claim 3 wherein said grains have an ash content of 2.2 mg./g. cellulose, a copper content of 3.4 µg./g. of cellulose, a carboxyl group content of 2.5 µeq./g. of cellulose, a cellulose content of 4.2 g. of cellulose per deciliter, and a wet density of 1.02.

5. The separating medium as claimed in claim 3 wherein said grains have an ash content of 3.0 mg./g. of cellulose, a copper content of 2.7 µg./g. cellulose, a content of carboxyl groups of 7.6 µeq./g. of cellulose, a cellulose content of 18.5 g. per deciliter and a wet density of 1.07.

6. The separating medium as claimed in claim 1 wherein said grains are beads.

References Cited

UNITED STATES PATENTS

| | | | |
|---|---|---|---|
| 3,179,587 | 4/1965 | Battista et al. | 210—198C |
| 3,252,270 | 5/1966 | Pall et al. | 210—502UX |

SAMIH N. ZAHARNA, Primary Examiner

U.S. Cl. X.R.

210—500